United States Patent
Buelow et al.

(10) Patent No.: US 9,053,565 B2
(45) Date of Patent: Jun. 9, 2015

(54) INTERACTIVE SELECTION OF A REGION OF INTEREST IN AN IMAGE

(75) Inventors: Thomas Buelow, Grosshansdorf (DE); Martin Bergtholdt, Hamburg (DE)

(73) Assignee: Koninklijke Philips N.V., Eindhoven (NL)

( * ) Notice: Subject to any disclaimer, the term of this patent is extended or adjusted under 35 U.S.C. 154(b) by 270 days.

(21) Appl. No.: 13/499,978

(22) PCT Filed: Sep. 28, 2010

(86) PCT No.: PCT/IB2010/054363
§ 371 (c)(1),
(2), (4) Date: Apr. 3, 2012

(87) PCT Pub. No.: WO2011/042833
PCT Pub. Date: Apr. 14, 2011

(65) Prior Publication Data
US 2012/0194425 A1   Aug. 2, 2012

(30) Foreign Application Priority Data
Oct. 5, 2009   (EP) .................................. 09172203

(51) Int. Cl.
G09G 5/00   (2006.01)
G06T 19/00   (2011.01)

(52) U.S. Cl.
CPC ...................................... *G06T 19/00* (2013.01)

(58) Field of Classification Search
USPC .......................... 345/419, 621, 623; 382/173; 600/407–410
See application file for complete search history.

(56) References Cited

U.S. PATENT DOCUMENTS

| | | | |
|---|---|---|---|
| 6,628,743 B1 * | 9/2003 | Drummond et al. | 378/8 |
| 2001/0033283 A1 | 10/2001 | Liang et al. | |
| 2008/0123914 A1 | 5/2008 | De Bliek et al. | |
| 2008/0260221 A1 | 10/2008 | Unal et al. | |
| 2009/0034684 A1 | 2/2009 | Bernard et al. | |

OTHER PUBLICATIONS

R. Raman, S. Napel, G. D. Rubin, Technical Developments: Curved-Slab Maximum Intensity Projection: Method and Evaluation, Feb. 10, 2003, Radiology, 229 (2003), pp. 255-260.*

R. W. Underberg, F. J. Lagerwaard, B. J. Slotman, J. P. Cuijpers, and S. Senan, Use of maximum intensity projections (MIP) for target volume generation in 4DCT scans for lung cancer, Sep. 1, 2005, Int. J. Radiat. Oncol., Biol., Phys. 63(1), 253-260.*

(Continued)

*Primary Examiner* — James A Thompson

(57) ABSTRACT

A system for selecting a region of interest in an image is provided. A user interface (1) is applied for receiving user input indicative of a region of interest (504) in an image (502). A slab selector (2) is provided for selecting a position and a thickness of a slab (503) of the image (502), based on a position and a size of the region of interest (504), the slab (503) comprising at least part of the region of interest (504). A visualization subsystem (3) is provided for visualizing the slab (503). The slab selector (2) is arranged for selecting the position and thickness of the slab (503) such that the slab (503) comprises the region of interest (504) and a thickness of the slab (503) corresponds to a size of the region of interest (504) in a thickness direction of the slab (503). The image comprises a dynamic image. The projection image (505) is obtained by processing voxel values of the dynamic image both along a ray and temporally.

20 Claims, 4 Drawing Sheets

(56) References Cited

OTHER PUBLICATIONS

Y. Kang, K. Engelke, W. A. Kalender, Interactive 3D editing tools for image segmentation, Mar. 1, 2004, Med. Image Anal., vol. 8, No. 1, pp. 35-46.*

Raman et al, "Curved-Slab Maximum Intensity Projection: Method and Evaluation", Radiology Radiol. Soc., vol. 229, No. 1, August 27, 2003, pp. 255-260.

Kang et al, "Interactive 3D Editing Tools for Image Segmentation", Medical Image Analysis, vol. 8, No. 1, Mar. 1, 2004 pp. 35-46.

Underberg et al, "Use of Maximum Intensity Projections (MIP) for Target Volume Generation in 4DCT Scans for Lung Cancer", International Journal of Radiation, vol. 63, No. 1, Sep. 1, 2005, pp. 253-260.

Cai et al, "Estimation of Error in Maximal Intensity Projeciton-Based Internal Target Volume of Lung Tumors: A Simulation and Comparison Study Using Dynamic Magnetic Resonance Imaging", International Journal of Radiation, vol. 69, No. 3, Sep. 20, 2007, pp. 895-902.

* cited by examiner

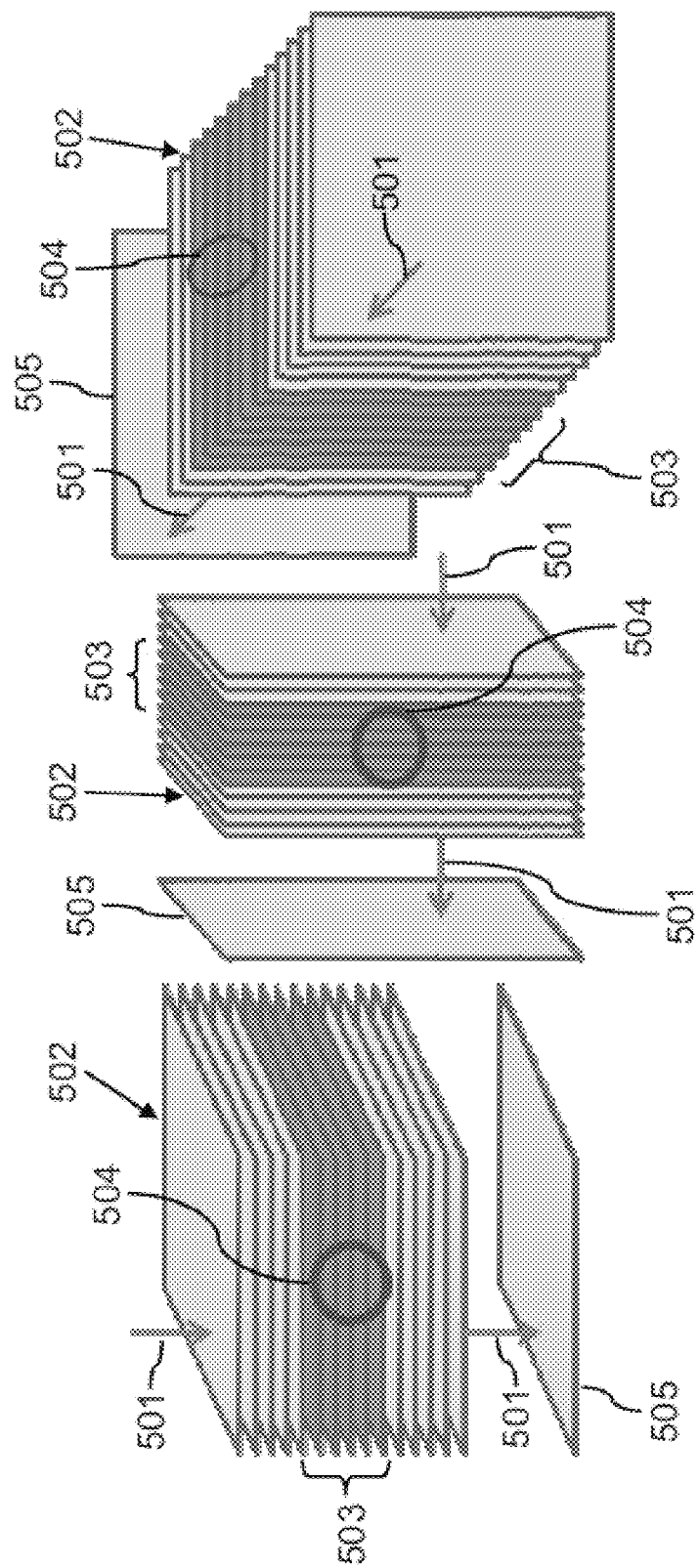

INTERACTIVE SELECTION OF A REGION OF INTEREST IN AN IMAGE

FIELD OF THE INVENTION

The invention relates to interactive selection of a region of interest in an image.

BACKGROUND OF THE INVENTION

In medical image viewing and computer aided diagnosis (CAD) applications, the user is regularly offered the opportunity to select a lesion or a tumor in a 3D medical image data set for imaging or processing. This selection may be performed by indicating a volume of interest which contains the lesion or tumor.

Known methods for such region-of-interest selection may allow the user to select a two-dimensional region of interest (2D ROI) in a user-selected 2D image slice. This 2D ROI may be automatically extended to a three-dimensional region of interest (3D ROI), or volume of interest (VOI). Alternatively, the user may be allowed to navigate through a stack of image slices and interactively place a 3D ROI, for example by drawing a contour in each image slice, or by indicating the first and last slice of the region of interest and a box or circle marking the boundaries of the ROI within the slices.

US 2009/0034684 discloses a method and system for displaying tomosynthesis images. The method includes displaying a bidimensional slice or slab image, selection on the displayed image of at least one volume of interest associated with a bidimensional region of interest located in the plane of the image, and displaying in the region of interest, according to the practitioner's wishes: images of slices of the volume of interest, three dimensional images of the volume of interest, and slabs obtained from the volume of interest. To define a volume of interest, one defines, on the displayed image, the position and size of a bidimensional region of interest, the position of the volume of interest being defined by the position of the region of interest and the depth of the volume of interest being adjusted automatically or manually. In the case where the displayed image is a slab, one defines the depth of the volume of interest as equal to the thickness of the slab.

The existing methods are perceived as not easy to use. Moreover it is not easy to visually inspect the three-dimensional region of interest.

SUMMARY OF THE INVENTION

It would be advantageous to have an improved system for interactive selection of a region of interest in an image. To better address this concern, a first aspect of the invention provides a system comprising:

a user interface for receiving user input indicative of a region of interest in an image;
a slab selector for selecting a position and a thickness of a slab of the image, based on a position and a size of the region of interest, the slab comprising at least part of the region of interest;
a visualization subsystem for visualizing the slab.

By visualizing the slab with a thickness and position based on a position and size of the region of interest, the slab shows a portion of the image which is highly relevant in view of the selected region of interest. In particular, the slab view may remove any objects in the image which obstruct the view of at least part of the region of interest. Consequently, the slab view is highly suitable for indicating a boundary of the region of interest, which enables the user to verify that the boundary of the region of interest is as he or she intends it to be. The thickness of the slab does not have to be fine-tuned manually, because the slab selector sets the thickness and position of the slab automatically. Also, since the thickness of the slab is based on the size of the region of interest, the user has more freedom to control the selection of the region of interest compared to the situation in which the depth of the volume of interest is made equal to the thickness of a pre-existing slab.

The slab selector may be arranged for selecting the position and thickness of the slab such that the slab comprises the region of interest and a thickness of the slab corresponds to a size of the region in a thickness direction of the slab. This way, the region of interest is completely visible in the slab, which enables the user to verify the boundaries of the region of interest based on the complete image information of the portion of the image within the region of interest. Moreover, the slab view removes any potentially view-obstructing objects in the image in front of and/or behind the region of interest.

The slab selector may be arranged for selecting at least three slabs, each comprising the region of interest, a respective thickness of a slab corresponding to a size of the region of interest measured in a respective thickness direction of the slab, the slabs having different orientations; and the visualization subsystem is arranged for visualizing the at least three slabs.

Three different orientations are generally enough to check the extent of the region of interest with sufficient accuracy.

The at least three slabs may be selected so as to be orthogonal to each other. The orthogonal arrangement is a logical arrangement, and useful for verifying the volume of interest as seen from three orthogonal directions.

The image may comprise a dynamic image. Such a dynamic image may comprise a temporal sequence of static images. The visualization subsystem may comprise a projection generator for generating a projection image of at least part of the dynamic image, a pixel value of the projection image being obtained by processing voxel values of the dynamic image both along a ray and temporally. By processing the voxel values along a ray and in at least some of the sequential images of the sequence of static images, a projection image is generated which combines the information from the sequence. This may make it unnecessary to view the complete sequence of images.

For example, a pixel value may correspond to the maximum or minimum voxel value occurring along a ray in the sequence of images. This way, when a contrast agent flows in and out of a voxel during the image sequence, the system may pick the voxel value in which the most contrast agent was present. Such voxel value would usually be the maximum or minimum voxel value in the sequence of images. The combined minimization along a ray and across the sequence provides a MIP-like projection image which the clinician can readily interpret, while combining information of multiple images of a sequence of images.

The user interface may be arranged for enabling a user to indicate the region of interest in the projection image of at least part of the dynamic image. Since the projection image contains information of the contrast agent flow throughout at least part of the sequence of images, the projection image can show the complete region where contrast agent has been. This makes it possible to indicate the region of interest without missing a part of the region where contrast agent has been.

The slab may comprise a slab of the dynamic image. The projection generator may be arranged for generating a projection image of the slab of the dynamic image. The result is a slab which contains the combined information of the dynamic image. This may comprise information about all locations where the contrast agent has been during the acquisition of the dynamic image.

The user interface may be arranged for receiving input relating to a two-dimensional size or shape of the volume of interest, the system further comprising a region extender for extending the volume of interest to a three-dimensional volume of interest based on the two-dimensional size or shape. This provides a particularly easy way to indicate a three-dimensional size or shape, by means of a two-dimensional size or shape. For example, if the two-dimensional shape is a circle, the circle may be extended into a three-dimensional sphere having the same radius as the two-dimensional circle. The size of the three-dimensional region of interest in the depth direction may be based on the two-dimensional size or shape. From the size of the three-dimensional region of interest in the depth direction of the slab, the slab selector can select a corresponding thickness of the slab. Moreover, slabs having different, possibly orthogonal, angular orientations may be produced, and these may have thicknesses corresponding to respective sizes of the automatically extended three-dimensional region of interest in the depth directions of the slabs.

The user interface may be arranged for enabling a user to indicate the two-dimensional size or shape in a slice or slab view of the image, and wherein the center of the volume of interest is assumed to be part of the slice or slab. This is a particularly natural way of indicating the position of a three-dimensional volume of interest.

A medical image acquisition apparatus may comprise the system set forth. This way, the region of interest can be indicated in an image which has been acquired with the image acquisition apparatus. A medical workstation may also comprise the system set forth. This allows the region of interest to be indicated at a convenient location of the medical workstation.

Another aspect of the invention provides a method of selecting a region of interest in an image, comprising:
  receiving user input indicative of a region of interest in an image;
  selecting a position and a thickness of a slab of the image, based on a position and a size of the region of interest, the slab comprising at least part of the region of interest; and
  visualizing the slab.

Another aspect of the invention provides a computer program product comprising instructions for causing a processor system to perform the method set forth.

BRIEF DESCRIPTION OF THE DRAWINGS

These and other aspects of the invention are apparent from and will be elucidated with reference to the embodiments described hereinafter. In the drawings.

FIGS. 5A, 5B, and 5C illustrate slabs of an image.

DETAILED DESCRIPTION OF EMBODIMENTS

In this description, a tool is disclosed which may be part of a user interface for the selection of objects (e.g., organs or tumors) in a 3D medical image. This selected object, or a sub-volume containing the selected object, might be the input for an automatic segmentation or image analysis algorithm. Using an input device, the user may be enabled to define and update a 2D region of interest (ROI) on a user-selected slice of a 3D image volume. The 2D ROI may be automatically extended to a 3D volume of interest (VOI). Three additional orthogonal projection views (e.g., MIPs) may display the image structure in the vicinity of the currently selected VOI. While the VOI is being modified by the user (shifted, resized, etc.), the MIP views may be updated in real-time in order to reflect the current selection of the VOI. This provides the user with an efficient means to select a 3D VOI in an image volume while providing reliable feedback on the correctness and completeness of the selected VOI. The tool may be implemented as a software option in medical imaging workstations or PACS systems or as part of a medical scanner console, for example a CT or MR scanner console. Hereinafter, the expression "region of interest" or "ROI" refers to a region in an image, which may be a two-dimensional region in a two-dimensional image or a three-dimensional region in a three-dimensional image. Consequently, a region of interest may also be a volume of interest.

For several applications, it is of importance that the target organ or tumor be fully enclosed in a region of interest. For example, an automatic segmentation task that is operative to segment an object inside a region of interest can be successful only if the object is fully enclosed in the region of interest. Existing methods for manually placing a VOI in a 3D image involve much manual interaction. Also, in some methods it is not clear from the visualization whether the object is fully enclosed in the VOI.

Figure 1:
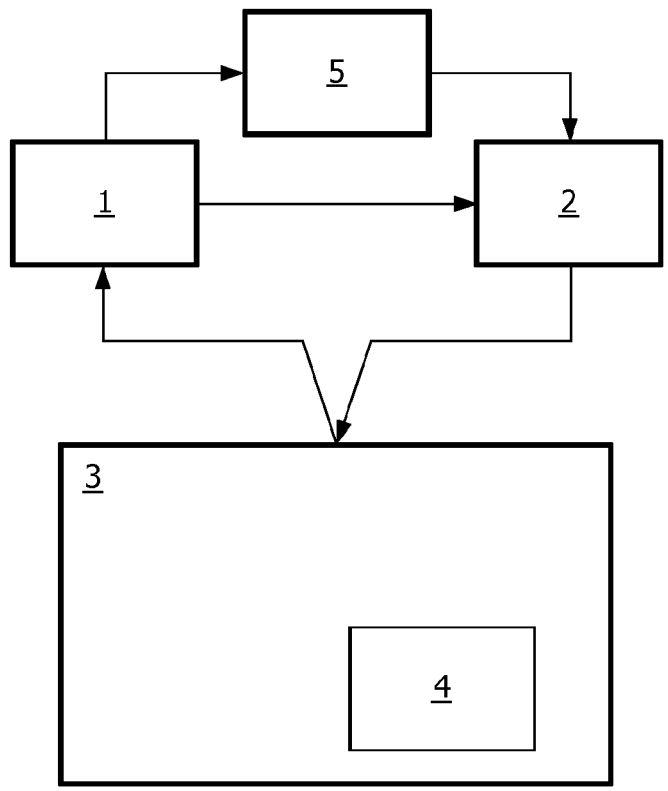
FIG. 1 is a diagram of a system for selecting a region of interest in an image.

FIG. 1 illustrates a system for selecting a region of interest in an image. The system may be used in an image processing apparatus, for example a medical image processing apparatus. The selected region may be used for further processing, for example the region may be subjected to a segmentation algorithm; such segmentation algorithms are known in the art per se. The system may be implemented partly or completely in software, or as a dedicated electronic circuit. The system may be part of a medical workstation or a console of a medical image acquisition apparatus. In the latter case, the system may be used for selecting a region of interest in images acquired by the image acquisition apparatus. The software may be executed on a computer system having a processor, a user input device, and a display. Moreover, a communications port may be used to retrieve image data and to transmit the selected region from and to a server system. The user input device may be coupled to user interface 1. In this way, the user interface 1 enables a user to provide user input indicative of a region of interest 504 in an image 502. Several ways of indicating a region of interest 504 in an image 502 are disclosed elsewhere in this description in greater detail. The image 502 may be a three-dimensional image, and the region of interest 504 may also be a three-dimensional region. Such a three-dimensional region of interest may also be referred to as a volume of interest.

The three-dimensional region of interest 504 is forwarded to slab selector 2. Based on the position and size of the region of interest, the slab selector 2 may select a position and a thickness of a slab 503 of the image 502. The slab selector 2 may be configured to select the position and thickness of the slab 503 such that it comprises at least part of the region of interest 504. The slab 503 is then forwarded to visualization subsystem 3. The visualization subsystem 3 may present a visualization of the slab 503. Such a visualization may include a maximum intensity projection or another kind of projection image or a volume rendering of the slab. To this end, the visualization subsystem 3 may be coupled to a display.

The slab selector 2 may be arranged for selecting the position and thickness of the slab 503 such that the slab 503 comprises the complete region of interest 504. Moreover, the thickness of the slab 503 may be chosen such that it corresponds to a size of the region of interest 504 in a thickness direction of the slab 503. This way, the thinnest slab which fully comprises the selected region of interest can be established and displayed.

The slab selector 2 may be arranged for selecting at least three slabs, as illustrated at 503 in FIGS. 5A, 5B, 5C. These slabs may be selected in the same way, fully comprising the region of interest. However, the slabs may have different orientations. By visualizing these differently-oriented slabs, the region of interest can be inspected from different viewing angles. The respective thickness of the slabs 503 may correspond to a size of the region of interest 504 measured in a respective thickness direction of the slab 503. The visualization subsystem 3 may be arranged for visualizing the at least three slabs 503. These at least three slabs 503 may be selected so as to be orthogonal to each other.

The system may be arranged for processing a dynamic image. Such a dynamic image may comprise a temporal sequence of static images 502. The visualization subsystem 3 may comprise a projection generator 4 for generating a projection image 505 of at least part of the dynamic image 502. A pixel value of the projection image 505 may be obtained by processing voxel values of the dynamic image both along a ray 501 and temporally. So, the voxel values along the ray 501 may be processed for all images of the temporal sequence of static images. In this way, any structure which is visible only in part of the sequence of images, can still be made visible in the projection image. To create a temporal MIP projection image, the pixel values may be selected to correspond to the maximum or minimum voxel value occurring along a ray 501 in the sequence of images.

The user interface 1 may be arranged for enabling a user to indicate the region of interest 504 in the projection image 505 of at least part of the dynamic image.

The slab selector 2 may be arranged for selecting a slab 503 of the dynamic image. The projection generator 4 may be arranged for generating a projection of the slab 503. For example, a temporal MIP of the slab 503 is generated.

The user interface 1 may be arranged for receiving input relating to a two-dimensional size or shape of the region of interest. For example, the user is enabled to click in a visualization of the image. Such a visualization may comprise a slice image or a projection image, for example. A pointer, for example a mouse pointer, in combination with mouse clicks, can be used to indicate the position, size, and/or shape of a two-dimensional region of interest, in a way known by the person skilled in the art. The two-dimensional region of interest may be forwarded to a region extender 5 which may be arranged for extending the two-dimensional region of interest to a three-dimensional region of interest 504. This extension may be based on the two-dimensional size or shape. Examples of how this extension may be realized will be explained in detail elsewhere in this description.

The user interface 1 may be arranged for enabling a user to indicate the two-dimensional size or shape in a slice or slab view of the image. This way, the center of the three-dimensional region of interest may be assumed to be part of the slice or slab. For example, the center of the three-dimensional region of interest may be assumed to be on the slice, or on the central slice of the slab. Moreover, the center may be assumed to be also the center of the two-dimensional region of interest. In this way, the center of the three-dimensional region of interest is uniquely determined.

Figure 2:
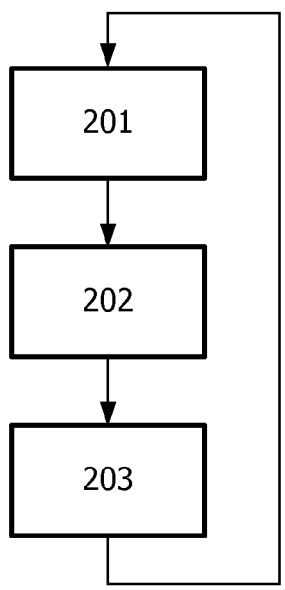
FIG. 2 is a flowchart of a method of selecting a region of interest in an image.

FIG. 2 illustrates a method of selecting a region of interest in an image. The method may comprise a step 201 of receiving user input indicative of a region of interest 504 in an image 502. Next, in step 202, a position and a thickness of a slab 503 of the image 502 may be selected based on a position and a size of the region of interest 504. Herein, the slab 503 may comprise at least part of the region of interest 504. Next, in step 203, the slab 503 may be visualized. Subsequently, the user may change the selection of the region of interest, so that the method is performed again from step 201. The method may be implemented in form of computer software. For example, a computer program product may comprise instructions for causing a processor system to perform the method of FIG. 2.

A user interface may allow the user to define a 3D VOI in a 3D medical image dataset. This VOI may be the input to a subsequent automatic processing step such as segmentation or feature extraction. A 2D slice viewer may be provided on which the user may define a 2D ROI. An automatic region extender may be provided for automatically extending the user-defined 2D ROI into a 3D VOI. Three orthogonal MIP views may be generated and displayed showing live updates of the 3D image data contained in the current selection of the VOI.

In the case of dynamic 3D data, a combined spatial and temporal MIP may be presented. To this end, the voxel with highest image intensity along a viewing ray and along the time axis may be selected for display in the combined spatial and temporal MIP. This way, all parts of the target structure may become visible upon lesion selection even if they only take up contrast agent (i.e., have a high image intensity) at a particular time point in the dynamic sequence.

Figure 3:
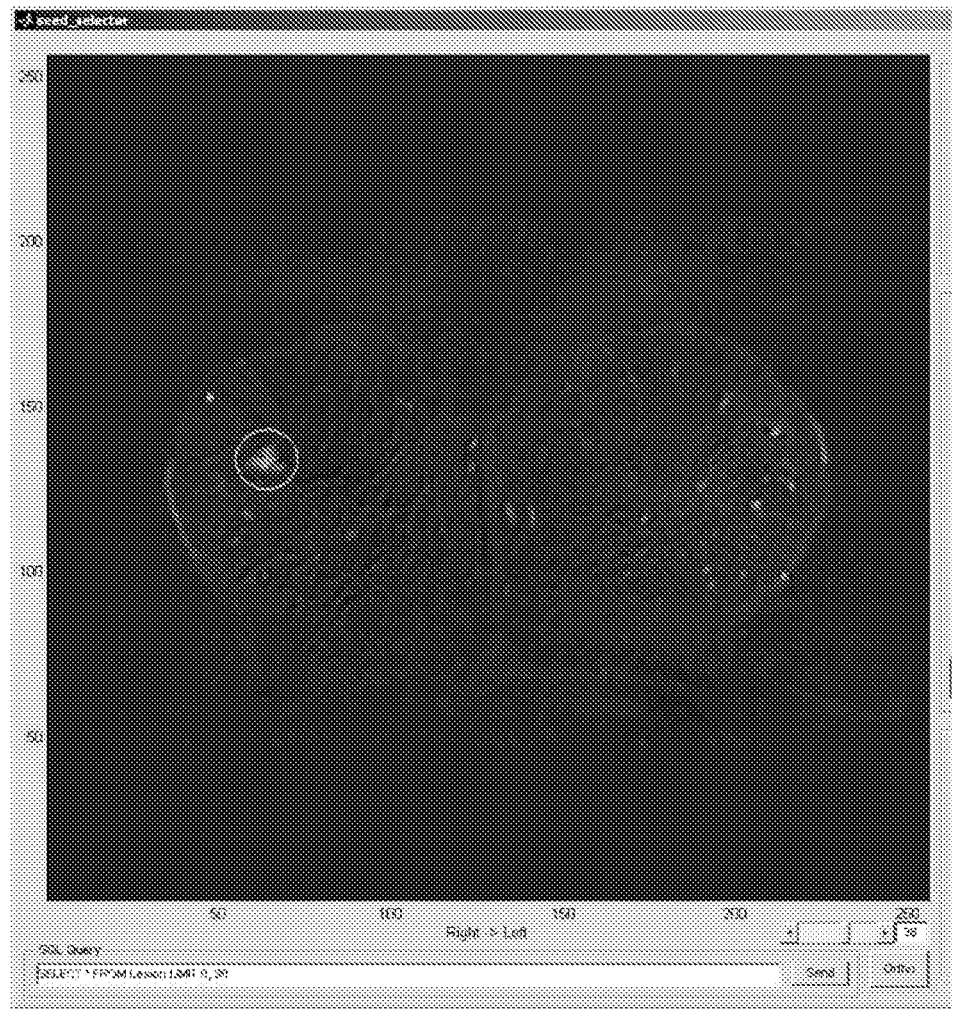
FIG. 3 shows a user interface panel with an image slice and a circle which represents a region of interest selected by a user.
Figure 4A:
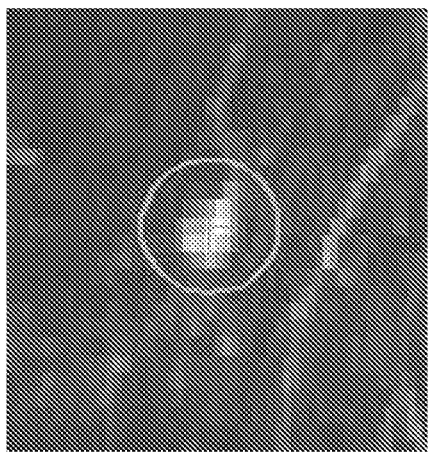
FIGS. 4A, 4B, and 4C show three orthogonal views of the region of interest.
Figure 4B:
Figure 4C:
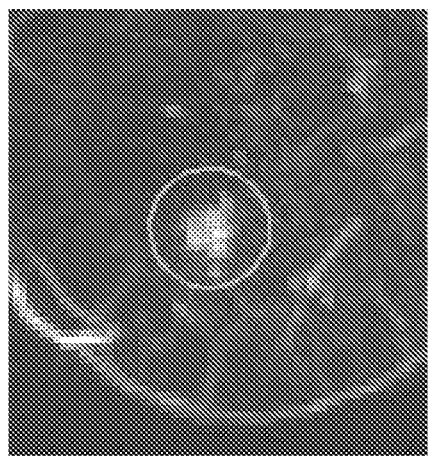

FIGS. 3 and 4A-C show a number of exemplary images displayed by an embodiment of the invention. FIG. 3 shows a user interface panel with an image slice and a circle which represents a region of interest selected by a user. The system extends this two-dimensional region of interest into a three-dimensional region of interest, in this case the circle is extended to a sphere with the same origin and radius as the circle. FIGS. 4A, 4B, and 4C show three orthogonal views of the region of interest. The region of interest is indicated in the Figures by means of a circle. The user can verify her/his selection by inspecting the three orthogonal views. In this case the orthogonal views are maximum intensity projections of orthogonally oriented slabs indicating the current sphere position by circular cross-sections. The slabs may intersect at the region of interest. The slab thickness may be close to or identical to the diameter of the selected sphere. The display may be updated in real-time as the user refines the region of interest, for example by translation of the circle or by changing its radius.

FIGS. 5A, 5B, and 5C illustrate slabs of an image which can be used for visualizing a region of interest. For example, FIG. 5A illustrates an axial slice, FIG. 5B illustrates a sagittal slice, and FIG. 5C illustrates a coronal slice. In these Figures, the same reference numerals have been used to indicate similar features, although the orientation of the features with respect to the image is different. However, the orientation of the region of interest 504 is fixed with respect to the image. For each orientation, the Figures show a ray 501 intersecting the image 502. The image 502 is drawn as a stack of image slices perpendicular to the ray 501. A slab 503 is shown in darker color. The slab 503 comprises the image slices intersecting or touching the region of interest 504. Some additional slices around the region of interest may be included in the slab as well. When generating a projection image 505 of a slab 503, only the slices of the slab 503 are taken into account. The remainder of the image 502, which is not comprised in the slab, is not taken into account in the visualization of the projection image 505. Consequently, only the structures comprised in the slab 503 are visible in the projection image 505. Any structures present in the image 502 outside the slab 503, which might obstruct the visibility of the structures in the slab 503, are not shown in the projection image 505. For computing a pixel value of the projection image 505, the system may process the voxel values along a ray 501 through the slab 503. For example, a minimal voxel value, a maximum voxel value, or an average voxel value may be included in the projection image 505.

A user input for selecting a region of interest may be arranged for enabling the user to position and/or resize a two-dimensional graphical shape. The user may manipulate the position and/or size of the graphical shape such that the object of interest is enclosed in the two-dimensional graphical shape. The graphical shape may comprise a simple geometric shape, such as a circle or a square. Alternatively, the graphical shape may be more complex and represent a model of the object of interest (e.g., generated as a 2D cross section through an organ model). Besides its spatial position the graphical structure can have additional degrees of freedom such as the radius in case of the circle and/or the rotation.

The two-dimensional graphical shape representing a region of interest may be automatically extended to a 3D shape representing a three-dimensional region of interest (or volume of interest). For example, the degrees of freedom of the 2D region of interest can be applied to a corresponding three-dimensional graphical shape. For example, a circle with origin and radius can be extended to a sphere with same origin and radius. The missing coordinate of the origin may be obtained by considering the position of the slice used for indicating the selection. Similarly, a square may be extended to a cube with the same origin and edge length. Similarly, a shape model of an object of interest may be extended from a two-dimensional cross section of the shape model to the full three-dimensional model.

Alternatively, the two-dimensional shape may be indicated in a projection image, and object detection techniques may be used to identify the object of interest and use this identification to obtain the depth parameter of the origin or position of the three-dimensional region of interest. Other ways to indicate a two-dimensional region of interest and/or a three-dimensional region of interest are known to the person skilled in the art.

For example, the user may be enabled to define the ROI in one view, for example an axial view. In addition to the view on which the user defines the ROI, three MIP views may be provided. These views can be used to display MIP views of the target object. In order to avoid obstruction of the view, a slab MIP may be displayed. For example, 3 orthogonal slab MIPs are generated from only those image slices that are touched by the 3D volume of interest generated from the 2D ROI provided by the user. It is also possible to generate slab images by only taking into account those voxels that are contained in the 3D volume of interest.

Projection views other than maximum intensity projections (MIPs) can be displayed. This also applies to slab images. Options include, but are not limited to, mean intensity projection (mIP) and minimum intensity projection (miniP).

In order to provide feedback on the current volume of interest selection to the user, the MIPs may be updated in real-time while the user selects the target structure. The degrees of freedom for the input definition may include translations within a currently selected image slice, scrolling to another input slice, or resizing of the input ROI. Each of these changes may be arranged to have a corresponding effect on the 3D VOI. This may cause new image slices to enter the scope of the VOI and/or image slices that already were included in the scope of the VOI to leave the scope of the VOI. Accordingly, additional slices are included or removed from the slab, respectively. In order to provide the user with useful feedback on the current VOI selection, the MIP views may be updated with each change in the VOI definition.

One of the applications for which the region selection may be used is segmentation of breast tumors in dynamic MR studies. These consist of multiple image volumes acquired sequentially over a period of time. Other applications include other dynamic imaging studies. Such applications may comprise a sequence of images, for example MR or CT images. For the segmentation and analysis it can be important that the entire lesion is enclosed in the user selected VOI. However due to the change of contrast during the time period in which the sequence of images is acquired, some parts of the tumor might only be visible in volumes acquired late in the temporal sequence (due to slow persistent enhancement) whereas other parts show up mostly in the early phase (due to fast inflow and washout of the contrast agent). In order to assure that all parts of the lesion that show increased contrast at any point in time are visible, a temporal component may be added to the MIP. Likewise, a temporal component may be added to other projection forming techniques, such as averaging. Given a number of MIPs generated from the image volumes acquired at times $t\_1$ to $t\_n$, The temporal MIP may be computed as $$\text{MIP\_temp}(x) = \max(\text{MIP}\_t\_1(x), \ldots, \text{MIP}\_t\_n(x)),$$

wherein MIP temp(x) denotes the temporal MIP at pixel x, "max" denotes the maximum value of the arguments, "MIP_t_1(x)" denotes the MIP generated from the image volume acquired at time $t\_1$ at pixel x, and "MIP_t_n(x)" denotes the MIP generated from the image volume acquired at time $t\_n$ at pixel x.

It will be appreciated that the invention also applies to computer programs, particularly computer programs on or in a carrier, adapted to put the invention into practice. The program may be in the form of a source code, an object code, a code intermediate source and object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a storage medium, such as a ROM, for example, a CD ROM or a semiconductor ROM, or a magnetic recording medium, for example, a floppy disc or a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or be used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for selecting a region of interest in an image, comprising:
   a user interface that receives input from a user that expressly defines a position and size of a region of interest in a two-dimensional image corresponding to an intended three-dimensional volume of interest;
   a region extender that extends the two-dimensional region of interest to a three-dimensional region of interest based on the size or shape of the two-dimensional region of interest;
   a slab selector that determines a position and a thickness of a slab of the image, based on the position and the size of the three-dimensional region of interest, the slab comprising at least part of the intended volume of interest; and
   a visualization subsystem that provides a visualization of the slab;
   wherein the user interface enables the user to alter at least one of the position and size of at least one of the two-dimensional and three-dimensional regions of interest when the determined slab does not encompass an entirety of the intended volume of interest.

2. The system according to claim 1, wherein the slab selector is arranged to determine the position and thickness of the slab such that the slab comprises the three-dimensional region of interest and a thickness of the slab corresponds to a size of the three-dimensional region of interest in a thickness direction of the slab.

3. The system according to claim 1, wherein the slab selector determines at least three slabs, each comprising the three-dimensional region of interest, a respective thickness of a slab corresponding to a size of the three-dimensional region of interest measured in a respective thickness direction of the slab, the slabs having different orientations; and
   the visualization subsystem provides a visualization of the at least three slabs.

4. The system according to claim 3, wherein the at least three slabs are orthogonal to each other.

5. The system according to claim 1, wherein the image comprises a dynamic image comprising a temporal sequence of static images, and wherein the visualization subsystem comprises a projection generator that generates a projection image of at least part of the dynamic image, a pixel value of the projection image being obtained by processing voxel values of the dynamic image both along a ray and temporally.

6. The system according to claim 5, wherein the pixel value corresponds to the maximum or minimum voxel value occurring along the ray in the sequence of images.

7. The system according to claim 5, wherein the user interface enables a user to indicate the two-dimensional region of interest in the projection image of the at least part of the dynamic image.

8. The system according to claim 5, wherein the at least part of the dynamic image comprises a slab of the dynamic image.

9. The system according to claim 1, wherein the user interface enables the user to indicate the size or shape of the two-dimensional region of interest in a slice or slab view of the image, and wherein the center of the intended volume of interest is assumed to be part of the slice or slab.

10. A medical image acquisition apparatus comprising the system according to claim 1.

11. A medical workstation comprising the system according to claim 1.

12. A method of selecting a region of interest in an image, comprising:
   receiving user input that expressly defines a position and size of a region of interest in a two-dimensional image corresponding to an intended volume of interest;
   extending the two-dimensional region of interest to a three-dimensional region of interest;
   determining a position and a thickness of a slab of the image, based on the position and the size of the three-dimensional region of interest, the slab comprising at least part of the intended volume of interest;
   visualizing the slab on a display device; and
   receiving second user input that alters the position or shape of the two-dimensional or three-dimensional region of interest when the slab does not encompass an entirety of the intended volume of interest.

13. The method according to claim 12, wherein
   determining the position and thickness of the slab includes determining at least three slabs, each comprising the three-dimensional region of interest, a respective thickness of a slab corresponding to a size of the three-dimensional region of interest measured in a respective thickness direction of the slab, the slabs having different orientations; and
   providing a visualization of the at least three slabs.

14. The method according to claim 12, wherein the image comprises a dynamic image comprising a temporal sequence of static images, and wherein the method includes generating a projection image of at least part of the dynamic image, a pixel value of the projection image being obtained by processing voxel values of the dynamic image both along a ray and temporally.

15. A non-transitory computer-readable medium that includes a program that, when executed by a processor, causes the processor to:

receive input from a user that expressly defines a position and size of a region of interest in a two-dimensional image;

extend the two-dimensional region of interest to a three-dimensional region of interest;

determine a position and a thickness of a slab of the image, based on the position and size of the three-dimensional region of interest, the slab comprising at least part of an intended volume of interest;

provide a visualization of the slab; and enable the user to alter the position or shape of the two-dimensional or three-dimensional region of interest when the slab does not encompass an entirety of the intended volume of interest.

16. The medium of claim 15, wherein the program causes the processor to determine the position and thickness of the slab such that the slab comprises the three-dimensional region of interest and a thickness of the slab corresponds to a size of the three-dimensional region of interest in a thickness direction of the slab.

17. The medium of claim 15, wherein the program causes the processor to determine at least three slabs, each comprising the three-dimensional region of interest, a respective thickness of a slab corresponding to a size of the three-dimensional region of interest measured in a respective thickness direction of the slab, the slabs having different orientations, and to provide a visualization of the at least three slabs.

18. The medium of claim 17, wherein the at least three slabs are orthogonal to each other.

19. The medium of claim 15, wherein the image comprises a dynamic image comprising a temporal sequence of static images, and wherein the program causes the processor to generate a projection image of at least part of the dynamic image, a pixel value of the projection image being obtained by processing voxel values of the dynamic image both along a ray and temporally.

20. The medium of claim 19, wherein the program causes the processor to enable the user to indicate the region of interest in the projection image of the at least part of the dynamic image.

* * * * *